(12) United States Patent
Takeuchi et al.

(10) Patent No.: US 6,187,141 B1
(45) Date of Patent: *Feb. 13, 2001

(54) WATER-DISINTEGRATABLE FIBROUS SHEET HAVING LAYERED STRUCTURE AND WIPING SHEET COMPRISING THE SAME

(75) Inventors: Naohito Takeuchi; Takayoshi Konishi; Daisuke Yamada, all of Mitoyo-gun (JP)

(73) Assignee: Uni-Charm Corporation, Ehime (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/154,285

(22) Filed: Sep. 16, 1998

(30) Foreign Application Priority Data

Sep. 24, 1997 (JP) .................................................. 97-258740

(51) Int. Cl.[7] ..................................................... D21F 11/00
(52) U.S. Cl. ......................... 162/127; 162/129; 162/112; 162/130; 162/132; 162/141; 162/142; 162/158; 162/149; 162/164.1; 162/168.1; 162/113; 424/402; 428/74; 428/249; 428/490
(58) Field of Search ............................... 162/158, 168.1, 162/111, 112, 125, 127, 129, 130, 132, 133, 175, 176, 177, 178; 424/402; 428/74, 249, 490

(56) References Cited

U.S. PATENT DOCUMENTS

| | | |
|---|---|---|
| 4,610,761 | 9/1986 | Eklund et al. . |
| 5,129,988 | 7/1992 | Parrington, Jr. . |
| 5,437,766 * | 8/1995 | Van Phan et al. ............... 162/127 |
| 5,487,813 | 1/1996 | Vinson et al. . |
| 5,635,028 | 6/1997 | Vinson et al. . |
| 5,851,352 * | 12/1998 | Vinson et al. ..................... 162/112 |

FOREIGN PATENT DOCUMENTS

| | | |
|---|---|---|
| 01168999 | 7/1989 | (EP) . |
| 0372388 | 6/1990 | (EP) . |
| 0496524 | 7/1992 | (EP) . |
| 05311120 | 3/1993 | (EP) . |
| 1-168999 | 7/1989 | (JP) . |
| 9-132896 | 5/1997 | (JP) . |
| 9-132897 | 5/1997 | (JP) . |
| WO 92/13137 | 8/1992 | (WO) . |

* cited by examiner

Primary Examiner—Stanley S. Silverman
Assistant Examiner—Mark Halpern
(74) Attorney, Agent, or Firm—Koda & Androlia

(57) ABSTRACT

A water-disintegratable fibrous sheet having a layered structure comprising: (a) at least one first fiber web comprising pulp of conifer and pulp of hardwood; (b) at least one second fiber web comprising pulp of conifer, having a content of pulp of hardwood less than that in said first fiber web or containing no pulp of hardwood, said first and second fiber webs forming said layered structure; and (c) a water-insoluble or water-swellable binder being added to at least one of said first and second fiber webs. The fibrous sheet excellent in water-disintegratability and strength can be obtained.

8 Claims, 3 Drawing Sheets

\*Content of LBKP
First fiber web>Second fiber web

Top layer (NBKP+LBKP)
Middle layer (NBKP+LBKP)
Bottom layer (NBKP)

*Content of Binder
Top layer<Middle layer<Bottom Layer

*Content of LBKP
Top layer>Middle layer>Bottom Layer

First fiber web
Second fiber web
Water-soluble adhesive
First fiber web
Second fiber web

WATER-DISINTEGRATABLE FIBROUS SHEET HAVING LAYERED STRUCTURE AND WIPING SHEET COMPRISING THE SAME

BACKGROUND OF THE INVENTION

1. Field of the Invention

The present invention relates to a water-disintegratable fibrous sheet that can be easily dispersed by a water stream. More particularly, the invention relates to a water-disintegratable fibrous sheet excellent in water-disintegratability and strength, and a water-disintegratable wiping sheet comprising a plurality of the water-disintegratable fibrous sheets laminated with each other.

2. Description of the Prior Art

Fibrous sheets are used for cleansing human skin, e.g., skin around anus, or cleaning a toilet room. The fibrous sheet is preferably water-disintegratable to be thrown away and drained in a toilet as it is. If it is not excellent in water-disintegratability, it requires a long time to be dispersed in a septic tank, and brings danger of clogging drainpipes of a toilet, when being thrown away and drained in a toilet. However, in general, a packed fibrous sheet impregnated with a cleansing liquid or the like has to be strong enough to endure conducting wiping operations while being impregnated with a cleansing liquid, and at the same time, has to keep water-disintegratability in the event of being thrown away and drained in a toilet. Therefore, a water-disintegratable fibrous sheet that has good water-disintegratability and strength sufficient to use is demanded.

Unexamined Published Japanese Patent Application No. H1-168999 discloses an easily water-dispersible cleaning product containing water-insoluble carboxymethylated pulp in a salt form of calcium. Unexamined Published Japanese Patent Applications No. H9-132896 and No. H9-132897 each discloses a water-disintegratable sheet, in which sodium carbonate is added to water-insoluble or water-swellable carboxymethyl cellulose. However, when a large amount of the binder, i.e., water-insoluble or water-swellable carboxymethylated pulp, is used to enhance sheet strength, water-disintegratability of the sheet is deteriorated.

SUMMARY OF THE INVENTION

An object of the present invention is to provide a fibrous sheet and a wiping sheet that have good water-disintegratability and strength sufficient to practical use.

The above and other objects of the present invention are accomplished by a water-disintegratable fibrous sheet having a layered structure comprising:

(a) at least one first fiber web comprising pulp of conifer and pulp of hardwood;

(b) at least one second fiber web comprising pulp of conifer, having a content of pulp of hardwood less than that in the first fiber web or containing no pulp of hardwood, the first and second fiber webs forming the layered structure; and (c) a water-insoluble or water-swellable binder being added to at least one of the first and second fiber webs.

In the water-disintegratable fibrous sheet of the invention, by laminating layers having different water-disintegratability and strength with each other to form a fibrous sheet, a water-disintegratable fibrous sheet excellent in water-disintegratability and strength can be obtained.

Furthermore, by laminating the water-disintegratable fibrous sheets of the present invention, a wiping sheet excellent in water-disintegratability and strength can be obtained.

DETAILED DESCRIPTION OF THE INVENTION

Figure 1:
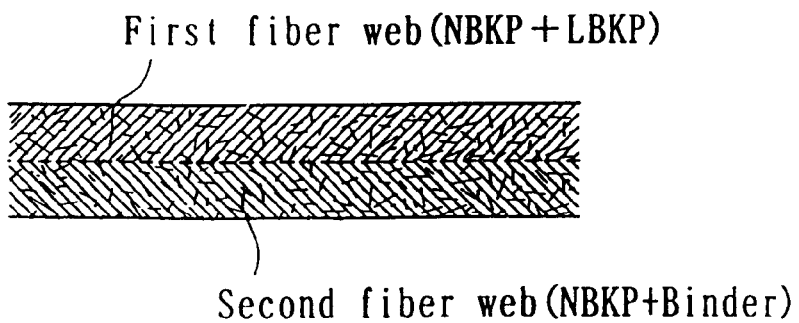
FIGS. 1A and 1B are cross sectional views of embodiments of the fibrous sheet having a two-layer structure.
Figure 1:
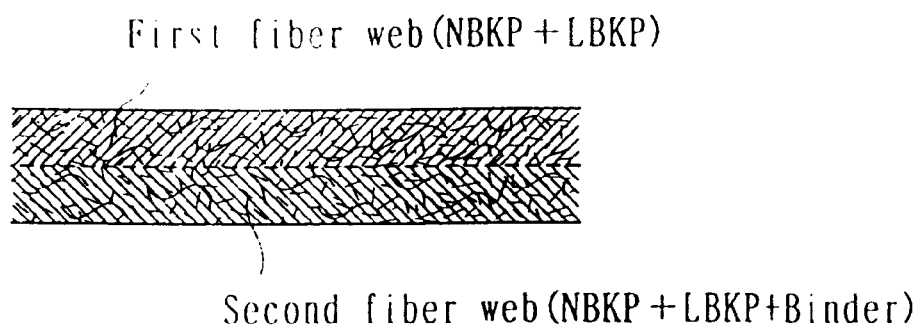

Pulp of conifer used in the invention is pulp produced by using conifer as a raw material. Representative examples of the pulp of conifer include bleached kraft pulp of conifer (NBKP), and kraft pulp of conifer is also included.

Pulp of hardwood used in the invention is pulp produced by using hardwood as a raw material. Representative examples of the pulp of hardwood include bleached kraft pulp of hardwood (LBKP), and kraft pulp of hardwood is also included.

What should be noted herein is that the average fiber length of the pulp of conifer and that of the pulp of hardwood are different from each other. The average fiber length (hereinafter referred to as "fiber length") of the pulp of conifer is longer than that of the pulp of hardwood. The fiber length of the pulp of hardwood is generally from 0.8 to 1.8 mm, whereas the fiber length of the pulp of conifer is generally from 2.0 to 4.5 mm. When fiber webs are produced by using these fibers and laminated each other and the fiber webs are different from each other in water-disintegratability and strength, a fibrous sheet can be obtained that has a characteristic feature in that water-disintegratability is enhanced by one of the fiber webs, and strength is maintained by the other of the fiber webs. As a result, a fibrous sheet excellent in water-disintegratability and strength can be obtained.

The function of improvement in water-disintegratability and strength of the fibrous sheet in the invention is described in detail below.

The pulp of conifer has been subjected to beating treatment for improvement in paper strength. Therefore, in the pulp of conifer, fibrillated fibers are strongly bonded to each other by hydrogen bonds. By adding thereto the pulp of hardwood which has the shorter fiber length and thus causes weak bonding strength, there generates unevenness in bonding strength of fibers, i.e. cellulose molecules. As a result, a fiber web containing both the pulp of conifer and the pulp of hardwood can be easily dispersed by a water stream, in other words, it exhibits excellent water-disintegratability. This is the first fiber web of the invention, mainly comprising pulp of conifer and pulp of hardwood. The language "mainly comprising" used herein means that the total content of the fibers is 90% by weight or more based on the total weight of the fiber web.

On the other hand, a fiber web containing a smaller amount of the pulp of hardwood than the first fiber web or containing no pulp of hardwood has higher strength than the first fiber web, because the bonding strength among the fibers of the pulp of conifer is kept higher. This is the second fiber web of the invention, comprising pulp of conifer, having a content of pulp of hardwood less than that in the first fiber web or containing no pulp of hardwood.

By laminating the first and second fiber webs to form a layered structure, a fibrous sheet having excellent water-disintegratability can be obtained. In this layered structure, since the fiber webs (layers) have different volumes of swelling and different swelling rates, it has a structure that can easily incorporate water upon contacting water. Therefore, the fibrous sheet of the invention is excellent in water-disintegratability in comparison to a fibrous sheet composed only of pulp of conifer. Furthermore, the fibrous sheet of the invention is excellent in strength in comparison to a fibrous sheet having a single-layer structure composed of pulp of hardwood and pulp of conifer.

In the present invention, a water-insoluble or water-swellable binder is added to at least one of the first and second fiber webs constructing the fibrous sheet, to further improve strength of the fibrous sheet. The water-insoluble or water-swellable binder is more preferable than a water-soluble binder in the present invention, because the fibrous sheet is excellent in water-disintegratability due to its layered structure, so that the water-solubility of the binder is not necessarily required and the water-insoluble or water-swellable binder can enhance wet strength of the fibrous sheet upon use in a wet state.

In the present invention, there can be exemplified many constitutional embodiments as follows.

(1) A water-disintegratable fibrous sheet comprises a first fiber web mainly containing pulp of hardwood (e.g., LBKP) and pulp of conifer (e.g., NBKP), and a second fiber web mainly containing pulp of conifer (e.g., NBKP) and containing no pulp of hardwood. The first fiber web does not contain a binder, and only the second fiber web contains a binder. FIG. 1A shows a schematic cross sectional view of this embodiment.

(2) A water-disintegratable fibrous sheet comprises a first fiber web mainly containing pulp of hardwood (e.g., LBKP) and pulp of conifer (e.g., NBKP), and a second fiber web mainly containing pulp of hardwood (e.g., LBKP) and pulp of conifer (e.g., NBKP). The content of the pulp of hardwood in the second fiber web is smaller than the content of the pulp of hardwood in the first fiber web, and the first fiber web does not contain a binder, and only the second fiber web contains a binder. FIG. 1B shows a schematic cross sectional view of this embodiment.

Figure 2:
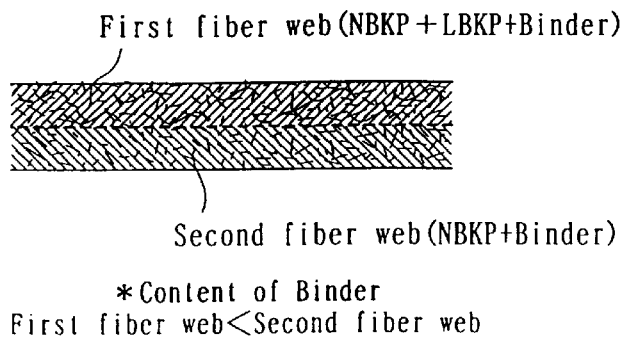
FIGS. 2A, 2B and 2C are cross sectional views of embodiments of the fibrous sheet having a two-layer structure.
Figure 2:
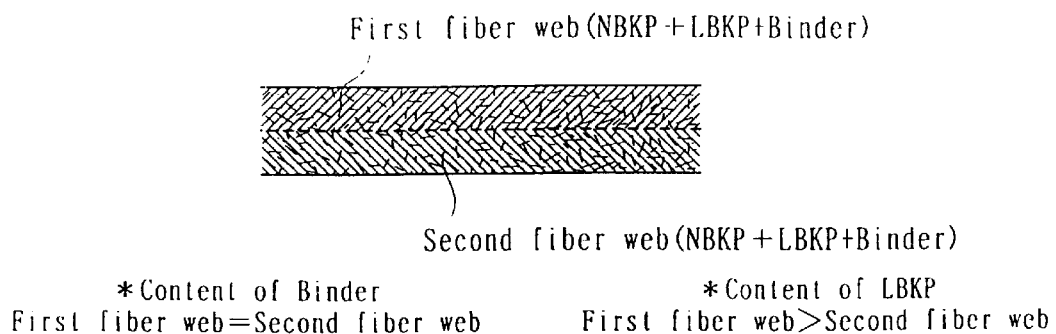
Figure 2:
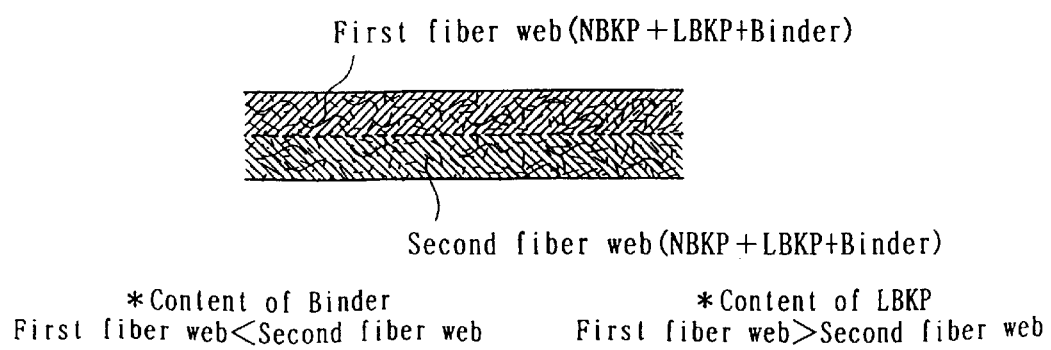

(3) A water-disintegratable fibrous sheet comprises a first fiber web mainly containing pulp of hardwood (e.g., LBKP) and pulp of conifer (e.g., NBKP), and a second fiber web mainly containing pulp of conifer (e.g., NBKP) and containing no pulp of hardwood. The first fiber web contains a binder in an amount smaller than that in the second fiber web. FIG. 2A shows a schematic cross sectional view of this embodiment.

(4) A water-disintegratable fibrous sheet comprises a first fiber web mainly containing pulp of hardwood (e.g., LBKP) and pulp of conifer (e.g., NBKP), and a second fiber web mainly containing pulp of hardwood (e.g., LBKP) and pulp of conifer (e.g., NBKP). The content of the pulp of hardwood in the second fiber web is smaller than the content of the pulp of hardwood in the first fiber web, and the first fiber web contains a binder in the same amount as in the second fiber web. FIG. 2B shows a schematic cross sectional view of this embodiment.

(5) A water-disintegratable fibrous sheet comprises a first fiber web mainly containing pulp of hardwood (e.g., LBKP) and pulp of conifer (e.g., NBKP), and a second fiber web mainly containing pulp of hardwood (e.g., LBKP) and pulp of conifer (e.g., NBKP). The content of the pulp of hardwood in the second fiber web is smaller than the content of the pulp of hardwood in the first fiber web, and the first fiber web contains a binder in an amount smaller than that in the second fiber web. FIG. 2C shows a schematic cross sectional view of this embodiment.

Figure 3:
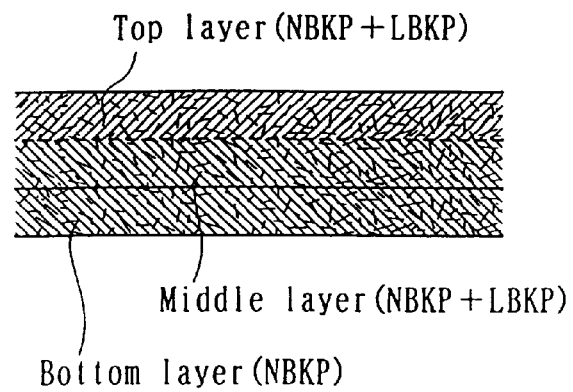
FIG. 3 is a cross sectional view of an embodiment of the fibrous sheet having a three-layer structure.

(6) A water-disintegratable fibrous sheet comprises one first fiber web as a top layer, and two second fiber webs as a middle layer and a bottom layer. The second fiber web as the middle layer mainly contains pulp of hardwood and pulp of conifer, wherein the content of the pulp of hardwood is smaller than that of the first fiber web as the top layer, and the second fiber web as the bottom layer mainly contains pulp of conifer but does not contain pulp of hardwood. A binder is contained in all the layers, which are laminated from the top layer, the middle layer to the bottom layer in this order to form the fibrous sheet, and the content of the binder thereof is (top layer)<(middle layer)<(bottom layer). FIG. 3 shows a schematic cross sectional view of this embodiment. The degree of water-disintegratability of the fibrous sheet is (top layer)>(middle layer)>(bottom layer), and the degree of strength of the fibrous sheet is (bottom layer)>(middle layer)>(top layer).

Still another embodiments of the water-disintegratable fibrous sheet of the invention can be exemplified, in that the fibrous sheet comprises two layers of the first and second fiber webs, the second fiber web does not contain pulp of hardwood, and the first fiber web contains the same amount of a binder as in the second fiber web.

As described in the foregoing, the present invention can be practiced variously by modifying the layered structure, the content of the pulp of hardwood and/or the content of the binder. These modifications can be appropriately selected depending on the use of the fibrous sheet and the kind of a solution to be impregnated into the fibrous sheet.

In the present invention, the content of the pulp of hardwood in the first fiber web is preferably 60% by weight or less to the total fiber content of the first fiber web. When the content of the pulp of hardwood becomes larger than the upper limit, strength of the fibrous sheet becomes insufficient and it cannot withstand practical use such as wiping. The content of the pulp of hardwood is more preferably from 10 to 50% by weight to the total fiber content of the first fiber web. In this range of the content, both strength and water-disintegratability are excellent.

The fibers used in the present invention mainly comprise the pulp of conifer and the pulp of hardwood as described above, and may further contain natural fibers such as cotton, synthetic fibers such as rayon, polypropylene, polyvinyl alcohol, polyesters and polyacrylonitrile, synthetic pulp made of polyethylene, and inorganic fibers such as glass wool. These fibers form fiber webs to be laminated into a fibrous sheet. The fiber web used herein means a sheet-formed lump of fibers where the directions of the fibers are arranged to some extent.

The total basis weight of the fibers constituting the fibrous sheet of the invention is preferably from 10 to 100 g/m$^2$. When the total basis weight is less than the lower limit, strength necessary for wiping operations cannot be obtained. When the total basis weight is more than the upper limit, flexibility desirable in the fibrous sheet is lost. When the fibrous sheet is used for wiping skin e.g., skin around anus, or cleaning a damageable object, the total basis weight of the fibers is more preferably from 20 to 60 g/m$^2$ from the viewpoints of strength and softness.

In the present invention, water-insoluble or water-swellable carboxymethyl cellulose is preferred as the binder. Solubility of carboxymethyl cellulose differs in accordance with a degree of etherification (DS), pH and so on. The water-insoluble or water-swellable carboxymethyl cellulose used in the present invention has a degree of etherification of from 0.3 to 0.6 and pH of 5.0 or more.

What is called carboxymethylated pulp is included in the carboxymethyl cellulose. The carboxymethylated pulp can be also used as the water-insoluble or water-swellable binder in the present invention. The carboxymethylated pulp is in various salt forms, such as an acid type, a sodium salt, a calcium salt, an aluminum salt, a barium salt, a zinc salt, a copper salt and a manganese salt, and the carboxymethylated pulp can be used in any salt forms in the present invention.

However, any binder can be used in the invention if it is water-insoluble or water-swellable and can be dispersed in water. For example, water-insoluble polyvinyl alcohol can also be used instead of the water-insoluble or water-swellable carboxymethyl cellulose.

In the present invention, further more, sodium carbonate and/or sodium hydrogencarbonate is preferably added to the fibrous sheet, when the water-insoluble or water-swellable carboxymethyl cellulose is used as the binder. The sodium carbonate and/or sodium hydrogencarbonate can enhance water-dispersibility of the water-insoluble or water-swellable carboxymethyl cellulose to some extent.

The sodium carbonate and/or sodium hydrogencarbonate may be added to all of the layers constituting the fibrous sheet of the invention, and may be added to a part of the layers.

In the case where the water-disintegratable fibrous sheet of the invention has a two-layer structure, for example, it is possible that the sodium carbonate and/or sodium hydrogencarbonate is added to a layer containing no pulp of hardwood, and the sodium carbonate and/or sodium hydrogencarbonate is not added to a layer containing pulp of hardwood.

The fibrous sheet of the present invention can be used both in a dry state and in a wet state for wiping operations. When the fibrous sheet is used in a wet state, the fibrous sheet has to be prevented from water-disintegrating by water contained therein during wiping operations and also has to keep wet strength therein sufficient to endure wiping operations.

Therefore, in the case where the carboxymethyl cellulose is used as the binder and the fibrous sheet is used in a wet state, a metallic salt that crosslinks the carboxymethyl cellulose is preferably added to the fibrous sheet. Wet strength of the fibrous sheet can be increased by crosslinking with the metallic salt.

The metallic salt may be contained in all of the layers, or may be contained a part of the layers. It is preferred that the metallic salt is in contact with the carboxymethyl cellulose in the fibrous sheet.

Examples of the metallic salt include salts of magnesium, calcium, barium, strontium, manganese, zinc, cobalt and nickel. Among these, at least one metallic salt selected from the group consisting of salts of calcium, zinc and magnesium is preferably used. By using these salts, wet strength of the fibrous sheet can be improved.

In the case where a metallic salt selected from magnesium, calcium, barium, strontium, manganese, zinc, cobalt and nickel is added to the fibrous sheet containing the water-insoluble or water-swellable carboxymethyl cellulose in all the layers, the metallic salt is preferably contained in an amount of 0.5 g or more per 100 g of the fibers. When the amount of the metallic salt is less than the lower limit, wet strength is not sufficient.

Also, in the case where the carboxymethyl cellulose is used as the binder and the fibrous sheet is used in a wet state, the fibrous sheet is preferably impregnated with an organic solvent. The organic solvent can increase wet strength of the fibrous sheet, as well. Examples of the organic solvent include a monohydric alcohol such as ethanol and isopropyl alcohol, and a polyhydric alcohol such as propylene glycol, polyethylene glycol and propylene glycol monomethyl ether. The organic solvent may be contained in all the layers, or may be contained in a part of layers.

The organic solvent is preferably added to the fibrous sheet in an amount of from 5 to 95 g per 100 g of the fibers from the standpoint of wet strength. The organic solvent is more preferably added in an amount of from 5 to 60 g to prevent deterioration of use feeling and rough dry skin of a user.

In the water-disintegratable fibrous sheet of the present invention, other materials may be added if they do not spoil the effects of the present invention. For example, a surfactant, a disinfectant, a preservative, a deodorizer, a moistening agent, an alcohol and the like can be added. These materials may be added to the above-mentioned organic solvent or water, so as to improve the fibrous sheet.

The water-disintegratable fibrous sheet of the invention can be used in a wet state for wiping operation, such as wet-type tissue paper and a duster for cleaning a toilet room and its circumference. When the water-disintegratable fibrous sheet of the invention is packed as a product previously wetted, it is sold by sealed up to prevent the fibrous sheet from drying.

Alternatively, the water-disintegratable fibrous sheet of the invention can be used by impregnating with water or a liquid drag upon use.

Furthermore, a plurality of the water-disintegratable fibrous sheets of the invention can be laminated to form a wiping sheet that is more suitable for wiping operation.

Figure 4:
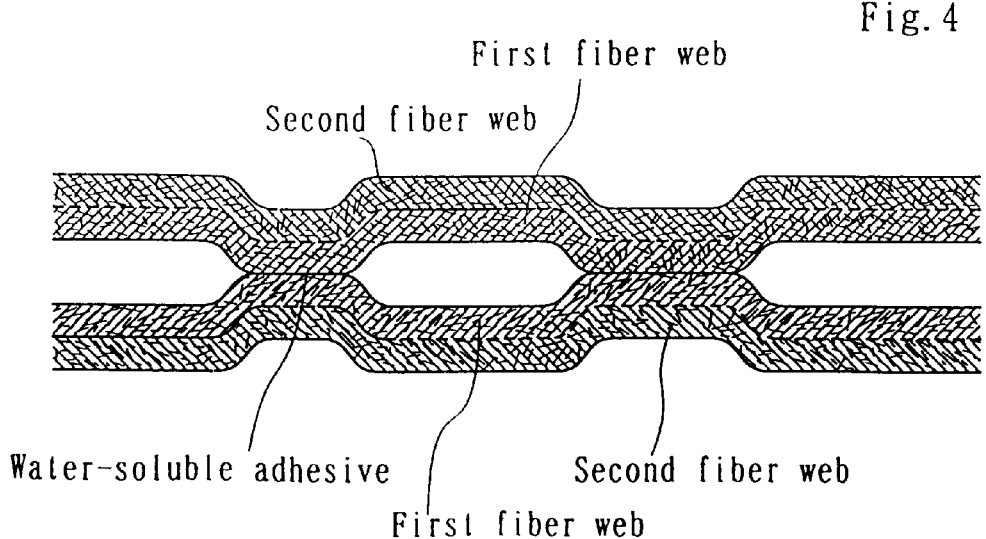
FIG. 4 is a cross sectional view of an embodiment of the wiping sheet comprising two fibrous sheets laminated with each other.

A specific example of the wiping sheet of the present invention preferably has a structure in which the water-disintegratable fibrous sheets are laminated in such a manner that the second fiber webs face outside of the wiping sheet, as shown in FIG. 4. This is because the outsides of the wiping sheet, i.e., sheet faces of the wiping sheet directly in contact with an article or human skin to be wiped upon use, are preferably excellent in strength. Furthermore, because the first fiber webs excellent in water-disintegratability face inside of the wiping sheet, the wiping sheet is dispersed from inside when it is disposed in a toilet and is in contact with a large amount of water, i.e., it is easily disintegrated by water in a short period of time.

For example, fibrous sheets having a three-layer structure as in exemplified by the constitutional embodiment (6) can be used for the wiping sheet, wherein layers having excellent water-disintegratability as the first fiber webs are positioned inside of the wiping sheet and facing to each other, so that water-disintegratability of the wiping sheet is gradually increased to inside thereof and strength is gradually increased to outside thereof.

In such cases, furthermore, it is not necessary for the plurality of the fibrous sheets to have the same structure. They may be different in the layered structure, the content of the pulp of hardwood and/or the content of the water-insoluble or water-swellable binder thereof.

Alternatively, a plurality of the water-disintegratable fibrous sheets of the invention may be laminated with each other to form the wiping sheet in such a manner that a layer excellent in strength alternates with a layer excellent in water-disintegratability, i.e., in such an order from the first fiber web, the second fiber web, the first fiber web to the second fiber web.

So as to produce the wiping sheet, preferably, the water-disintegratable fibrous sheets are partially bound with each other while being laminated. By binding them, strength thereof upon use can be further improved.

In order to partially bind the fibrous sheets with each other, it is preferred to emboss the fibrous sheets. By embossing the fibrous sheets, feeling to the touch and the effect of wiping operation upon use can be improved.

Alternatively, the fibrous sheets may be partially bound with an adhesive. In such cases, the adhesive is preferably a water-soluble adhesive, so that strength of the wiping sheet can be further improved without deterioration of water-disintegratability thereof. Examples of the water-soluble adhesive include water-soluble carboxymethyl cellulose, methylcellulose, and water-soluble polyvinyl alcohol.

The wiping sheet comprising the water-disintegratable fibrous sheets can be used in the form in that the wiping sheet is folded. The wiping sheet can be used in a wet state or in a dry state.

The invention is further described in more detail by referring to the following examples, but the invention is not construed as being limited to them.

EXAMPLE 1

Bleached kraft pulp of conifer (i.e., NBKP) with a CSF (Canadian Standard Freeness) of 570 ml and bleached kraft pulp of hardwood (i.e., LBKP) with a CSF (Canadian Standard Freeness) of 720 ml were used as raw material fibers. As a binder, water-insoluble carboxymethyl cellulose (carboxymethyl cellulose chicorate produced by Nichirin Chemical Industries, Ltd., DS: 0.42, pH 5.8) was used.

The water insoluble carboxymethyl cellulose was added in a solution containing the bleached kraft pulp of conifer (NBKP) dispersed therein in such a manner that the resulting solution having total weight of 100 g of the pulp and the binder contains 8 g of water insoluble carboxymethyl cellulose. Thereafter, in the solution containing the raw material fibers and carboxymethyl cellulose dispersed therein, 50 g of sodium carbonate was added per 100 g of the carboxymethyl cellulose, and the resulting solution was used as a raw material of a second fiber web. On the other hand, the bleached kraft pulp of conifer (NBKP) and the bleached kraft pulp of hardwood (LBKP) were mixed with water, and the resulting solution was used as a raw material of a first fiber web. The resulting raw materials of the first fiber web and the second fiber web were subjected to two-layer paper manufacturing by using a paper machine (short mold—cylinder mold—Yankee machine).

The raw material of the first fiber web was first manufactured by the short mold part of the paper machine to form into the first fiber web having a sheet shape with a basis weight of 11.25 g/m$^2$. The raw material of the second fiber web was then manufactured by the cylinder mold of the paper machine to form into the second fiber web having a sheet shape with a basis weight of 11.25 g/m$^2$ as integrated with the first fiber web, to produce a fibrous sheet having a two-layer structure.

At this time, an amount of the bleached kraft pulp of hardwood to that of the bleached kraft pulp of conifer in the first fiber web was varied to prepare Examples. The content of the bleached kraft pulp of conifer and the content of the bleached kraft pulp of hardwood based on the total weight of fibers in the first fiber web, in each of Examples 1-1, 1-2, 1-3, 1-4 and 1-5, are shown in Table 1 (% by weight). The crape ratio of each fibrous sheet was 10%.

The thus-produced fibrous sheet was impregnated with a solution obtained by mixing propylene glycol monomethyl ether, calcium chloride and water in a ratio of 20/0.5/79.5 in an amount of 200 g per 100 g of the fibrous sheet, to obtain a water-disintegratable fibrous sheet.

The water-disintegratable fibrous sheets thus impregnated were then allowed to stand at 20° C. for 24 hours and then measured for water-disintegratability and wet strength.

Water-disintegratability was measured according to the test of water-disintegratability of toilet paper regulated under JIS (Japanese Industrial Standard) P4501. Specifically, a specimen obtained by cutting the water-disintegratable fibrous sheet into a square of 10 cm×10 cm was put in a beaker containing 300 ml of ion-exchanged water, followed by stirring with a rotor. The rotational speed was 600 r.p.m. The state of dispersion of the fibrous sheet was continuously observed, and the time required for completion of dispersion was measured. (The results are shown in tables with a unit of second.)

Wet strength was measured in such a manner that the above-obtained water-disintegratable fibrous sheet was cut to a test piece having a dimension of 25 mm width and 150 mm length, and wet strength of the test piece was measured with a Tensilon test machine at a chuck distance of 100 mm and a tensile speed of 100 mm/min. Wet strength was measured in both the machine direction (MD) and the cross direction (CD) of the fibrous sheet. Strength at breakage (gf) was taken as a test result of wet strength. (In the Tables, the results are shown in terms of g/25 mm.)

As Comparative Example, a raw material of a second fiber web was prepared in the same manner as in Examples. A raw material of a first fiber web was prepared by adding the water-insoluble carboxymethyl cellulose to fibers composed only of the bleached kraft pulp of conifer in the similar manner as in Examples, so as to prepare a fibrous sheet from the first fiber web and the second fiber web. The resulting fibrous sheet was impregnated with the same solution as in Examples in an amount of 200 g per 100 g of the fibrous sheet, to obtain a water-disintegratable fibrous sheet. The resulting water-disintegratable fibrous sheet was measured for water-disintegratability and wet strength in the same manner as in Examples.

The results obtained are shown in Table 1.

TABLE 1

|  | Example 1-1 | Example 1-2 | Example 1-3 | Example 1-4 | Example 1-5 | Comparative Example |
|---|---|---|---|---|---|---|
| Amount of NBKP (% by weight) | 90 | 70 | 60 | 50 | 40 | 100 |
| Amount of LBKP (% by weight) | 10 | 30 | 40 | 50 | 60 | 0 |
| Water-disintegratability (second) | 49 | 42 | 39 | 32 | 30 | 64 |
| Wet Strength of MD (g/25 mm) | 162 | 153 | 148 | 145 | 138 | 166 |
| Wet Strength of CD (g/25 mm) | 103 | 92 | 89 | 77 | 75 | 111 |

It is understood from the results shown in Table 1 that Examples are excellent in water-disintegratability while wet strength of Examples and Comparative Example are in the same level.

EXAMPLE 2

The water insoluble carboxymethyl cellulose was added in a solution containing the same bleached kraft pulp of conifer (NBKP) as in Example 1 dispersed therein in such a manner that the resulting solution having total weight of 100 g of the pulp and the binder contains 8 g of water insoluble carboxymethyl cellulose. Thereafter, in the solution containing the fibers and the carboxymethyl cellulose dispersed therein, 50 g of the sodium carbonate was added per 100 g of the carboxymethyl cellulose, and the resulting solution was used as a raw material of a second fiber web. On the other hand, the water insoluble carboxymethyl cellulose was added in a solution containing the bleached kraft pulp of conifer (NBKP) and the bleached kraft pulp of hardwood (LBKP) were mixed therein in such a manner that the resulting solution having total weight of 100 g of the pulp and the binder contains 2 g of water insoluble carboxymethyl cellulose. Thereafter, in the solution containing the fibers and the carboxymethyl cellulose dispersed therein, 50 g of sodium carbonate was added per 10 g of the carboxymethyl cellulose, and the resulting solution was used as a raw material of a first fiber web. The resulting raw materials of the first fiber web and the second fiber web were subjected to two-layer paper manufacturing by using a paper machine (short mold—cylinder mold—Yankee machine).

The raw material of the first fiber web was first manufactured by the short mold part of the paper machine to form into the first fiber web having a sheet shape with a basis weight of 11.25 g/m². The raw material of the second fiber web of the fibrous sheet was then manufactured by the cylinder mold of the paper machine to form into the second fiber web having a sheet shape with a basis weight of 11.25 g/m² as integrated with the second fiber web, to produce a fibrous sheet having a two-layer structure. The ratio of two-layer manufacture of the first fiber web and the second fiber web is 1/1.

At this time, an amount of the bleached kraft pulp of hardwood to that of the bleached kraft pulp of conifer in the first fiber web was varied to prepare Examples. The content of the bleached kraft pulp of conifer and the content of the bleached kraft pulp of hardwood based on the total weight of fibers in the first fiber web, in each of Examples 2-1, 2-2, 2-3, 2-4 and 2-5, are shown in Table 2 (% by weight) The crape ratio of each fibrous sheet was 10%.

The thus-produced fibrous sheet was impregnated with the same solution as in Example 1 in an amount of 200 g per 100 g of the fibrous sheet, to obtain a water-disintegratable fibrous sheet.

The resulting water-disintegratable fibrous sheets were allowed to stand at 20° C. for 24 hours, and then measured for water-disintegratability and wet strength in the same manner as in Example 1.

As Comparative Example, a raw material of a second fiber web was prepared in the same manner as in Examples. A raw material of a first fiber web was prepared by adding the water-insoluble carboxymethyl cellulose to fibers composed only of the bleached kraft pulp of conifer in the similar manner as in Examples, so as to prepare a fibrous sheet from the first fiber web and the second fiber web. The resulting fibrous sheet was impregnated with the same solution as in Examples in an amount of 200 g per 100 g of the fibrous sheet, to obtain a water-disintegratable fibrous sheet. The resulting water-disintegratable fibrous sheet was measured for water-disintegratability and wet strength in the same manner as in Examples.

The results obtained are shown in Table 2.

TABLE 2

|  | Example 2-1 | Example 2-2 | Example 2-3 | Example 2-4 | Example 2-5 | Comparative Example |
|---|---|---|---|---|---|---|
| Amount of NBKP (% by weight) | 90 | 70 | 60 | 50 | 40 | 100 |
| Amount of LBKP (% by weight) | 10 | 30 | 40 | 50 | 60 | 0 |
| Water-disintegratability (second) | 56 | 48 | 44 | 37 | 34 | 73 |
| Wet Strength of MD (g/25 mm) | 166 | 157 | 150 | 148 | 140 | 170 |
| Wet Strength of CD (g/25 mm) | 132 | 118 | 112 | 93 | 81 | 141 |

What is claimed is:

1. A water-disintegratable wiping sheet used in a wet state comprising two water-disintegratable fibrous sheets, wherein
   each of said water-disintegratable fiber sheets comprises:
   a first fiber web comprising pulp of conifer and pulp of hardwood without a binder;
   a second fiber web comprising pulp of conifer, said second fiber web containing no pulp of hardwood and said first fiber web and second fiber web forming a layered structure; and
   a water-insoluble or water-swellable binder added to only said second fiber web;
   said second fiber web has a higher wet strength than the first fiber web, and
   said first fiber web is more water disintegratable than said second fiber web, and wherein
   said two water-disintegratable fibrous sheets have a wet strength of 75 g/25 mm or higher and are partially bonded one on the other with a water-soluble adhesive so that said second fiber web faces outside of said wiping sheet.

2. A water-disintegratable wiping sheet as claimed in claim 1, wherein a content of said hardwood pulp in said fist fibrous web is 60% by weight or less to a total fiber content of said first fiber web.

3. The water-disintegratable wiping sheet as claimed in claim 2, wherein the content of said hardwood pulp in said first fiber web is 10 to 50% by weight.

4. The water-disintegratable wiping sheet as claimed in claim 3, wherein said binder is water-insoluble or water-swellable carboxymethyl cellulose, and said adhesive is water-soluble carboxymethyl cellulose.

5. The water-disintegratable wiping sheet as claimed in claim 4, wherein said water-insoluble or water-swellable carboxylmethyl cellulose as the binder has a degree of etherification of 0.3 to 0.6 and a pH of 5.0 or more.

6. The water-disintegratable wiping sheet as claimed in claim 5, wherein at least one of sodium carbonate and sodium hydrogen carbonate is added to said fibrous sheet.

7. The water-disintegratable wiping sheet as claimed in claim 6, wherein at least one metallic salt selected from the group consisting of salts of calcium, zinc and magnesium is added to said fibrous sheet.

8. The water-disintegratable wiping sheet as claimed in claim 7, wherein said fibrous sheet is impregnated with an organic solvent which is at least one compound selected from the group consisting of monohydric alcohol and polyhydric alcohol.

* * * * *